(12) United States Patent
Waz-Ambrozewicz et al.

(10) Patent No.: US 9,621,250 B2
(45) Date of Patent: Apr. 11, 2017

(54) FEMTO ACCESS POINT OPERABLE WITH DIFFERENT SPATIAL CHARACTERISTIC ANTENNA PATTERNS

(75) Inventors: Andrzej Waz-Ambrozewicz, Wroclaw (PL); Maciej Pakulski, Czernica (PL)

(73) Assignee: Nokia Solutions and Networks Oy, Espoo (FI)

( * ) Notice: Subject to any disclaimer, the term of this patent is extended or adjusted under 35 U.S.C. 154(b) by 877 days.

(21) Appl. No.: 13/501,493

(22) PCT Filed: Oct. 16, 2009
(Under 37 CFR 1.47)

(86) PCT No.: PCT/EP2009/063558
§ 371 (c)(1),
(2), (4) Date: Aug. 31, 2012

(87) PCT Pub. No.: WO2011/044947
PCT Pub. Date: Apr. 21, 2011

(65) Prior Publication Data
US 2013/0045692 A1    Feb. 21, 2013

(51) Int. Cl.
*H04B 1/00* (2006.01)
*H04B 7/06* (2006.01)
(Continued)

(52) U.S. Cl.
CPC ........... *H04B 7/0695* (2013.01); *H04B 7/063* (2013.01); *H04B 7/088* (2013.01); *H04W 72/046* (2013.01); *H04W 84/045* (2013.01)

(58) Field of Classification Search
CPC ...... H04B 7/063; H04B 7/0695; H04B 7/088; H04W 72/046; H04W 84/045
(Continued)

(56) References Cited

U.S. PATENT DOCUMENTS

| 6,480,167 B2* | 11/2002 | Matthews | 343/795 |
| 2007/0225000 A1* | 9/2007 | Cleveland | 455/446 |

(Continued)

FOREIGN PATENT DOCUMENTS

| WO | WO 92/13398 | 8/1992 |
| WO | WO 2009/086991 A1 | 7/2009 |

OTHER PUBLICATIONS

Mika Husso et al., Adaptive Antennas and Dynamic Spectrum Management for Femtocellular Networks: A Case Study, 2008, IEEE, 978-1-4244-2017-9/08, 5.*

(Continued)

*Primary Examiner* — Xin Jia
(74) *Attorney, Agent, or Firm* — Harrington & Smith (57) ABSTRACT

It is described a femto access point for providing wireless access for a user equipment to a femto cell of a telecommunication network. The femto access point includes an antenna which is adapted to operate with different spatial characteristic antenna patterns, and a transceiver unit, which is coupled to the antenna and which is adapted to activate at least one of the different spatial characteristic antenna patterns. It is further described a method for providing wireless access for a user equipment to a femto cell of a telecommunication network via a femto access point. The method includes activating at least one spatial characteristic antenna pattern of an antenna of a femto access point, wherein the antenna is adapted to operate with different spatial characteristic antenna patterns.

13 Claims, 3 Drawing Sheets

(51) Int. Cl.
  *H04B 7/08* (2006.01)
  *H04W 72/04* (2009.01)
  *H04W 84/04* (2009.01)

(58) Field of Classification Search
  USPC .......................... 455/443, 444, 63.1, 114.2
  See application file for complete search history.

(56) References Cited

U.S. PATENT DOCUMENTS

| | | | |
|---|---|---|---|
| 2008/0009244 A1* | 1/2008 | Lee ................................ | 455/69 |
| 2009/0233545 A1* | 9/2009 | Sutskover et al. .............. | 455/25 |
| 2010/0034134 A1* | 2/2010 | Larsen .......................... | 370/315 |
| 2011/0018766 A1* | 1/2011 | Steer ........................ | G01S 1/14 |
| | | | 342/368 |

OTHER PUBLICATIONS

Husso, Mika, et al., "Adaptive Antennas and Dynamic spectrum Management for Femtocellular Networks: A Case Study", © 2008 IEEE, 5 pgs.

\* cited by examiner

FEMTO ACCESS POINT OPERABLE WITH DIFFERENT SPATIAL CHARACTERISTIC ANTENNA PATTERNS

FIELD OF INVENTION

The present invention generally relates to the field of mobile telecommunication networks. In particular, the present invention relates to femto cells being located within the spatial coverage of a mobile telecommunication network. Specifically, the present invention relates (a) to a femto access point for providing wireless access for a user equipment to a femto cell of a telecommunication network and (b) to a method for providing wireless access for a user equipment to a femto cell of a telecommunication network via a femto access point.

ART BACKGROUND

Femto Access Points (FAPs) usually operate at the same frequency band as the rest of the wireless radio network. Therefore, they create interferences to the external overlaying network (i.e. macro cells) as well as to each other. This is caused by the fact that FAPs are equipped with omni-directional antennas that radiates equal energy at all directions, also in unwanted ones.

Further, the basic principle behind FAPs is that these devices, while being part of the Mobile Operator's Network, are installed at the customers' premises (e.g. at private homes) without any kind of network planning. Therefore, if several FAPs are installed close to each other, the radiation of each may influence the performance of other FAPs using the same radio frequency, as well as the connections to macro base stations established by mobile stations located in the vicinity. This results in degradation of Quality of Service, increase in the transmitted power by the affected mobile stations (which also shortens the battery life) and can lead in extreme cases to the complete blockage of service in affected areas.

FAPs are typically equipped with a frequency scanner searching for the cleanest frequency available. Such scanning can be executed (a) just once during commissioning of the FAP, (b) periodically in regular time intervals or (c) at each power up. Thereby, possible changes in the radio environment could be taken into account by the respective FAP. However, such a solution would result in a frequency assignment being optimal for the respective FAP but not optimal from mobile network point of view.

As has already been mentioned above, known FAPs typically use omni-directional antennas, which radiate (and receive) radio power to (and from) all spatial directions. This allows the FAP to be installed in virtually any place and still allows a reasonable wireless network quality provided to different communication devices.

However, most communication devices that are connected to them tend to create relatively stationary and repetitive propagation conditions as they are not moved around that much. The communication devices could be, for example, personal computers, but one can also think of many other devices that could be equipped with wireless access capability, e.g. home appliances such as a refrigerator, a washing machine and a home alarm system. Most of these devices are stationary and thus situated always in relatively stationary propagation conditions. Even if the devices are mobile, e.g. portable computers, the users tend to use them in only a couple of preferred locations (e.g. table at living room, armchair at bedroom, etc.), also creating relatively stationary and repetitive propagation conditions.

As such there is a large wastage of radio power by the access point as radio power is radiated into areas or locations where there is actually no receiver. Further, a lot of unnecessary interference is created outside the intended zone of radio coverage. As radio power is wasted, the connected communication devices can thus operate at suboptimal conditions only, causing them to have less than best possible quality of service.

In order to improve the radio connection between the wireless access point and the attached communication devices one could think about increasing the transmit power. However, this could result in significant interferences to the other communication devices because the signal will "leak out" of the intended coverage zone.

There may be a need for improving the radio connection between a wireless access point and at least one communication device without increasing the leakage of radio power being transmitted by the wireless access point.

SUMMARY OF THE INVENTION

This need may be met by the subject matter according to the independent claims. Advantageous embodiments of the present invention are described by the dependent claims.

According to a first aspect of the invention there is provided a Femto access point for providing wireless access for a user equipment to a femto cell of a telecommunication network: The femto access point comprises (a) an antenna which is adapted to operate with different spatial characteristic antenna patterns, and (b) a transceiver unit, which is coupled to the antenna and which is adapted to activate at least one of the different spatial characteristic antenna patterns.

The described femto access point (FAP) is based on the idea that by using a selected and, for a radio connection to a particular communication device appropriate antenna pattern, the performance of femto radio connections can be significantly enhanced and an unwanted power leakage into regions outside the intended coverage zone of the FAP can be significantly reduced.

Generally speaking, the described FAP is capable of using a variable antenna pattern at the home wireless access point. Thereby, an intelligent antenna pattern selection can used which naturally is crucial for maximizing the performance of the FAP.

The described FAP may be relevant for any kind of wireless telecommunication networks such as for instance a Femto Long Term Evolution or a Femto UTRAN telecommunication network.

It is pointed out that the different radiation patterns may apply both for transmitting radio signals with the antenna and for receiving radio signals by the antenna. If the spatial characteristic of a selected antenna pattern is optimized for transmitting radio signals to a specific location within a femto cell, the antenna will provide for an enhanced sensitivity for receiving radio signals from a transmitting communication device being presently located at least approximately at that location.

The FAP, which may also be denoted as a home wireless access point or a Home NodeB (HNB) may be a point of attachment serving a home cell or a so called femto cell. The home respectively the femto cell may be for instance a small cellular region being located within the spatial coverage of a cellular telecommunication network. The FAP may be located at the premises of a customer of an internet service provider, of a customer of a mobile network operator and/or of a customer of any other telecommunication service provider.

The FAP may be a low cost, small and reasonably simple unit that can connect to a Base Station Controller (in a Global System for Mobile communications (GSM) network) and/or to a core network (in a Long Term Evolution (LTE) network).

By contrast to a wide area (WA) base station the FAP may be a much cheaper and less powerful device. This may hold in particular for the spatial coverage. The FAP may be designed for a maximal number of users respectively a maximal number of communication devices. Thereby, the maximal number may be typically between 5 and 20. By contrast thereto, a WA base station may be designed for serving much more users respectively communication devices. A WA base station may serve for instance 50, 100 or even more users respectively communication devices.

A further important difference between a FAP serving a femtocell and a WA base station serving an overlay or macro cell of a cellular telecommunication network can be seen in restricting the access of user equipments (UEs) respectively communication devices. A FAP typically provides access to a closed user group and/or to predefined communication devices only. This may be achieved by a rights management system, which can be implemented in the FAP. With such a rights management system it may be prevented for instance that an unauthorized user can use a private and/or a corporate owned printer, which represents a communication device being assigned to the femtocell of the home base station. By contrast thereto, a WA base station provides an unlimited access for user equipments provided that the user of the respective user equipment has a general contract with the operator of the corresponding mobile telecommunication network or at least with an operator, which itself has a basic agreement with the operator of the WA base station.

The user equipment (UE) may be any type of communication end device, which is capable of connecting with an arbitrary telecommunication network access point such as a base station, a relay node and a FAP. Thereby, the connection may be established in particular via a wireless radio transmission link. In particular the UE may be a cellular mobile phone, a Personal Digital Assistant (PDA), a notebook computer, a desktop computer and/or any other a movable or a stationary communication device.

The described FAP may provide in particular the advantages of a quality of service improvement, an interference reduction mechanism and/or a power consumption reduction.

According to an embodiment of the invention the antenna comprises at least two antenna elements and the different spatial characteristic antenna patterns are achievable by varying a phase shift between the antenna elements.

The phase shift can be applied both when the FAP is transmitting a radio signal to a UE and when the FAP is receiving a radio signal from a UE. In the transmitting case the antenna characteristics are changed by varying the phase shift between different radiated antenna elements.

According to a further embodiment of the invention the antenna elements are patch elements, which are arranged in an antenna array.

The antenna array comprising at least two radiating and/or receiving patch elements may be placed on the surface of a housing of the FAP. Thereby, an antenna array with some predefined sets of spatial characteristic radiation patterns to choose from can be employed.

According to a further embodiment of the invention the antenna is a flat panel multi beam antenna. This may provide the advantage that the described FAP can be realized simply by implementing the functionality that is needed to replace an omni-directional antenna of a known FAP by the flat panel multi beam antenna and to provide the necessary functionality such as an appropriate electronic circuitry and logic in order to properly drive the flat panel multi beam antenna.

Thereby, intelligent spatial shaping of the radiation pattern combined with frequency/scrambling code coordination between the FAP and other access points will maximize the performance of the whole network and increase the overall performance which can be offered.

According to a further embodiment of the invention the transceiver unit comprises a learning system, which, after having been successfully trained, is adapted to select an appropriate spatial characteristic antenna pattern. Thereby, in order to determine the best spatial characteristic antenna pattern, initially a learning phase takes place during which the various spatial characteristic antenna patterns are selected for a short time during which the FAP maintains a normal communication with a UE. From the different spatial characteristic antenna patterns the one resulting in the best quality of the signal of all the served UEs may be selected and stored by the FAP. This can be done by using a memory which is associated with the transceiver unit. A control unit of the FAP respectively of the transceiver unit will then search for a repetition of the spatial characteristic antenna pattern selected as optimal and attempt to find the rules allowing to select the particular pattern for instance for a given time and/or for a given user/requested service. Thereby, a correlation between time and/or user respectively requested service can be made. Once a re-occurrence of the selected spatial characteristic antenna pattern is detected permitting the correlation, the learning phase may terminate. The corresponding results of the learning phase can be stored in a memory such as the above mentioned memory of the transceiver unit.

Using the results obtained be a previously performed learning phase may be especially beneficial in case of non-mobile UE that will usually be placed at the same location all the time. This might apply in particular for instance for a TV set, a standalone internet radio receiver, a refrigerator, a washing machine, a home alarm system etc.

The learning phase may be terminated when a re-occurrence of certain spatial characteristic antenna pattern is found and correlated with time or user (or service). Time or user specific spatial characteristic antenna patterns may be offered during normal operation phase.

It is mentioned that the learning phase may be periodically re-activated. Thereby, the repetition rate for re-activating the learning phase may be subject to the specific FAP implementation.

According to a further embodiment of the invention the femto access point further comprises a sensor system for sensing the environment of the Femto Access Point, wherein the sensor system is adapted to provide the transceiver unit information which can be taken into account to activate an appropriate spatial characteristic antenna pattern.

The sensor system may comprise for example an orientation sensor, which could provide the transceiver unit or a control unit of the FAP respectively of the transceiver unit with orientation information. Such orientation information could be useful for instance if the FAP is located in the upper floor of a building such that it makes no sense to cover the spatial region above the FAP because it is not possible that any communication device is located there. Further, the sensor system may comprise for instance a light detector, which might be able to indicate to the FAP where there are windows.

According to a further embodiment of the invention the femto access point is adapted (a) to receive neighbor information about neighboring access points and (b) to assign appropriate frequency and/or scrambling codes used for communication between the femto access point and the user equipment based on the received neighbor information.

The neighbor information may be provided to the FAP in particular by the UE by using appropriate transmit reports to the FAP. Thereby, for instance a certain number of (for instance six) strongest neighbor access points (of the UE) can be taken into account. The received neighbor information could be used by the FAP in addition for assignment of the frequency and/or scrambling codes used for communication between the FAP and the UE. Thereby, an appropriate frequency coordination mechanism between different access points may be implemented. This can further minimize interference between the FAP and the neighboring access points such as for instance macro base stations or relay nodes.

The described use of neighbor information may be in particularly advantageous when a main beam of the FAP will trace the served UE and may lead to the configuration where the FAP is pointing its signal into an area served by a neighboring access point (e.g. a macro base station). In this case a FAP gateway of the FAP may be fed with the neighbor strength reports provided by the UE and act by instructing the FAP which frequencies and/or scrambling codes shall be used for a reliable communication with the UE.

Generally speaking, the described FAP is capable of using variable spatial characteristic antenna patterns. The optimal spatial characteristic antenna pattern for permanent use is selected by comparing quality reports sent by neighbouring macro cells for each of the tested spatial characteristic antenna patterns for instance during the learning phase as has been mentioned above.

According to a further aspect of the invention there is provided a method for providing wireless access for a user equipment to a femto cell of a telecommunication network via a femto access point, in particular via a femto access point as described above. The provided method comprises activating at least one spatial characteristic antenna pattern of an antenna of a femto access point, wherein the antenna is adapted to operate with different spatial characteristic antenna patterns.

Also the described method is based on the idea that by using a selected and, for a radio connection to a particular communication device appropriate spatial characteristic antenna pattern, the performance of femto radio connections can be significantly enhanced and an unwanted power leakage into regions outside the intended coverage zone of the femto access point (FAP) can be reduced.

The different spatial characteristic radiation patterns may apply both for transmitting and receiving radio signals with the FAP. In other words, with respect to the FAP an appropriate spatial characteristic radiation pattern may be selected for Uplink (UL) signals from an UE to the FAP and for Downlink (DL) signals from the FAP to a UE. This may mean that if the spatial characteristic of a selected antenna pattern is optimized for transmitting radio signals to a specific location within a femto cell, the antenna will automatically provide for an enhanced sensitivity for receiving radio signals from a transmitting communication device being presently located at least approximately at that location.

According to an embodiment of the invention the method further comprises carrying out a learning phase. Thereby, for activating the at least one spatial characteristic antenna pattern results obtained by the learning phase are taken into account.

The learning phase may be accomplished by an initialization procedure, which can be triggered for instance after a first power up of the FAP. Alternatively, the learning phase can be accomplished at regular time intervals and/or after a deterioration of the quality of a wireless connection between the FAP and a UE has been detected. Further, the learning phase can be accomplished at each power up of the FAP.

According to a further embodiment of the invention carrying out the learning phase comprises (a) successively selecting the different spatial characteristic antenna patterns for radiating a radio signal by the femto access point, (b) receiving the radio signal for each selected spatial characteristic antenna pattern by a receiving communication device, (c) measuring the level of each received radio signal, and (d) reporting to the femto access point which spatial characteristic antenna pattern allows for the best radio link between the femto access point and the receiving communication device.

The receiving communication device may be any network element, which is capable of receiving the radio signals which have been transmitted by the femto access point. In particular, the receiving communication device may be the user equipment as described above or a macro base station of a cellular telecommunication network, which surrounds the femto cell being defined by the femto access point.

Each spatial characteristic antenna pattern may be selected for a short time such as for instance a few milliseconds. During this short time period the FAP may radiate a predetermined test signal. Preferably, this test signal will be radiated with a maximum radio transmission power.

According to a further embodiment of the invention (a) for each successively selected spatial characteristic antenna pattern the radio signal is received and the respective signal strength is measured by at least two macro base stations being assigned to a macro telecommunication network and (b) each of the at least two macro base stations reports about the influence of at least one selected spatial characteristic antenna pattern on the performance of the macro telecommunication network.

Generally speaking, macro base stations and preferably neighboring macro base stations may measure the level of signal coming from the FAP and select the signal giving the best performance in terms of link quality and capacity of the area served.

Further, it may be also possible that call qualities ongoing in the neighboring macro cells are analyzed and compared with the aim to select the time respectively the period during which the highest signal quality was achieved.

According to a further embodiment of the invention (a) each of the at least two macro base stations report to a dedicated functionality which spatial characteristic antenna pattern allows for the best performance of the macro telecommunication network and (b) the dedicated functionality compares the reports of the at least two macro base stations and informs the femto access point about a specific spatial characteristic antenna pattern, which allows for the best performance of the macro telecommunication network.

The dedicated functionality may be realized for instance in a central management node of a cellular telecommunication network.

Put in other words, the dedicated functionality may compare all base stations reports and selects the time stamp indicating the period in which the best performance has been obtained from the network point of view. This time stamp may then be delivered to the femto access point which will select the given spatial characteristic antenna pattern for the permanent use. The time stamp may be delivered to the femto access point directly or indirectly via a core network.

It is mentioned that some additional functionality may be implemented within the macro telecommunication network in order to enable the assessment of the respective interference level and in choosing the optimal spatial characteristic antenna patterns. This additional functionality may be implemented either on the control plane or on the user plane. In case of an implementation on the control plane some slight adaptations of the current 3GPP standards may be required. An implementation on the user plane may provide the advantage that there is no impact to standardized network nodes.

It is mentioned that according to a further embodiment of the invention the may be provided a computer program for providing wireless access for a user equipment to a femto cell of a radio telecommunication network via a femto access point, wherein the computer program, when being executed by a data processor, is adapted for controlling or for carrying out any embodiment of the method as described above.

The computer program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The program element may be available from a network, such as the World Wide Web, from which it may be downloaded.

It is mentioned that the invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It is further mentioned that according to a further embodiment of the invention there is provided a computer readable medium, on which there is stored a computer program for providing wireless access for a user equipment to a femto cell of a radio telecommunication network via a femto access point. The computer program, when being executed by a data processor, is adapted for controlling or for carrying out any embodiment of the method as described above.

The computer-readable medium may be readable by a computer or a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium, a computer-readable memory, a random access memory, an erasable programmable read-only memory, a computer-readable software distribution package, a computer-readable signal, a computer-readable telecommunications signal, computer-readable printed matter, and a computer-readable compressed software package.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustration in the drawing is schematically. It is noted that in different figures, similar or identical elements are provided with the same reference signs or with reference signs, which are different from the corresponding reference signs only within the first digit.

Figure 1:
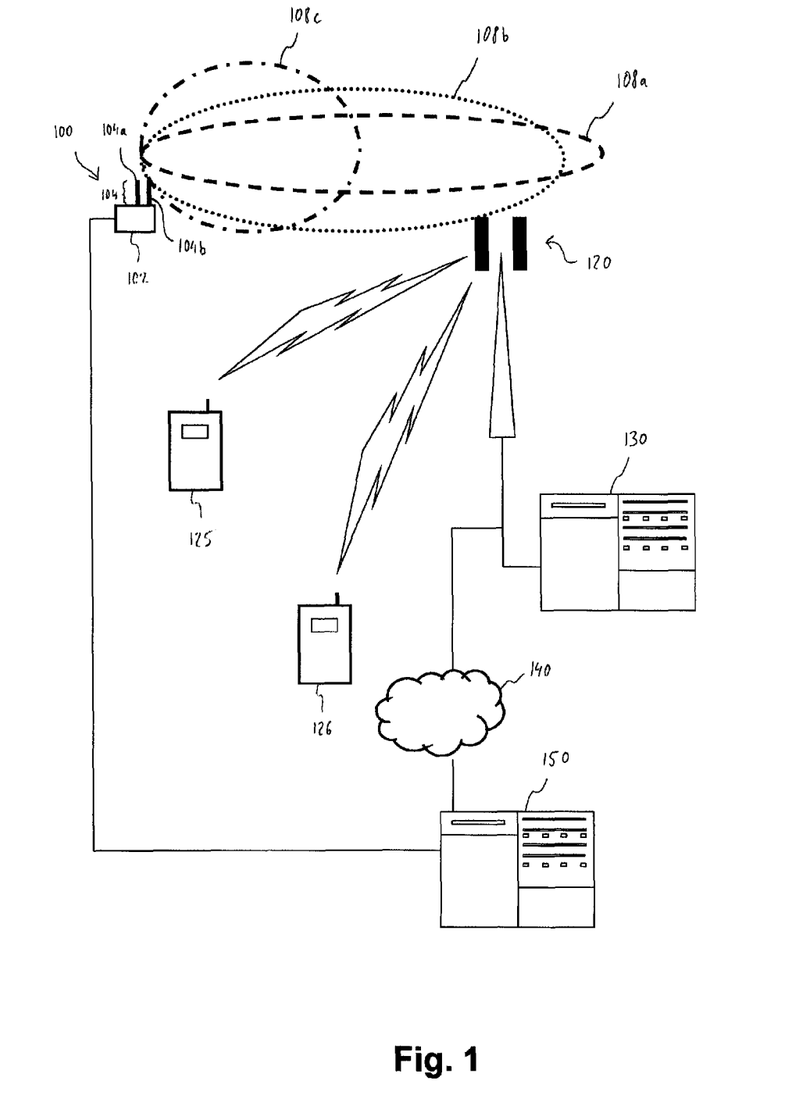
FIG. 1 shows an illustration for a mechanism for adjusting individual femto access point radiation patterns based on measurements performed by macro network elements and reports from other user equipments.

FIG. 1 shows an illustration for a mechanism for adjusting individual femto access point radiation patterns based on measurements performed by macro network elements and reports from other user equipments.

A femto access point 100 in accordance with an embodiment of the invention comprises a transceiving unit 102 and an antenna 104 being electrically connected to the transceiving unit 102. The antenna 104 is mechanically connected to a housing of the transceiving unit 102. The antenna 104 comprises two antenna elements 104a and 104b, which can be radiated in a coordinated manner. According to the embodiment described here the antenna elements 104a and 104b can be provided with a transmit signal, wherein a relative phase shift is imposed between the transmit signal components which are fed to the two antenna elements 104a, 104b. By varying the phase shift between the different antenna elements 104a, 104b, different spatial characteristic antenna patterns, a first spatial characteristic antenna pattern 108*a*, a second spatial characteristic antenna pattern 108*b* and third spatial characteristic antenna pattern 108*c* can be realized.

It is mentioned that the number of antenna elements is not limited to two. It is of course possible to employ more antenna elements. Generally, the higher the number of antenna elements is the larger is the number of possible spatial characteristic antenna pattern variations.

The femto access point 100 is capable of successively radiating different test signals, a first test signal being radiated with the first spatial characteristic antenna pattern 108*a*, a second test signal being radiated with the second spatial characteristic antenna pattern 108*b* and a third test signal being radiated with the third spatial characteristic antenna pattern 108*c*.

A macro base station 120 of a cellular telecommunication network is receiving the various test signals. Further, user equipments 125 and 126, which are currently served by the macro base station 120, also receive the various test signals. The macro base station 120 and the user equipments 125 and 126 measure the signal strength of the respective test signals and report the same to a dedicated functionality of the cellular telecommunication network. Thereby, the measurement report from the user equipments 125 and 126 are transmitted indirectly to the central management node 130 via the macro base station 120. According to the embodiment described here the dedicated functionality is a central management node 130.

(1) The central management node 130 stores the various signal strength measurements obtained by the macro base station 120 and the user equipments 125 and 126. (2) Further, the central management node 130 performs a Quality of Service (QoS) monitoring for ongoing calls depending on the various successively activated spatial characteristic antenna pattern 108*a*, 108*b* and 108*c*. (3) Furthermore, the central management node 130 performs a selection of the spatial characteristic antenna pattern which produces the smallest QoS degradation.

Information about the least QoS degrading spatial characteristic antenna pattern is forwarded to the femto access point 100 via a core network 140 and a gateway 150 for the femto access point 100. The femto access point 100 is then operated with this least QoS degrading spatial characteristic antenna pattern 108*a*, 108*b* or 108*c*. Therefore, by optimizing the radiation pattern of the femto access point 100 interferences between the femto access point 100 and the macro telecommunication network can be effectively decreased.

Figure 2:
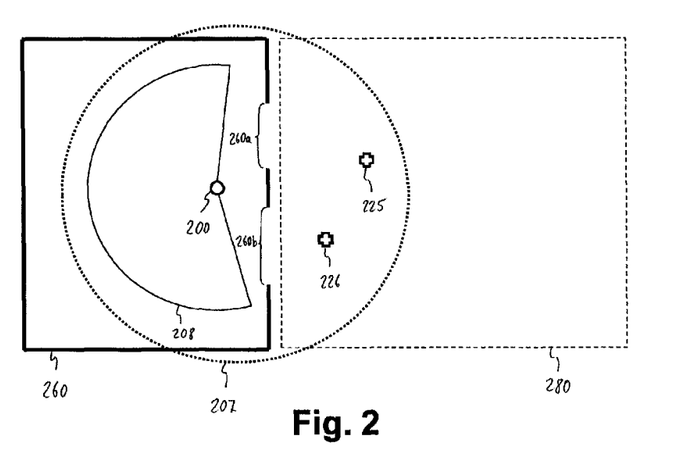
FIG. 2 shows an antenna radiation of an individual femto access point operating with an adjusted radiation pattern in order to minimize interference with a macro network.

FIG. 2 shows an antenna radiation of an individual femto access point 200 operating with an adjusted radiation pattern 208 in order to minimize interference with a macro network having a coverage area 280. According to the embodiment described here the femto access point 200 is deployed indoor in a private apartment 260. Of course, the femto access point 200 could also be deployed in an office or in a shop.

The private apartment 260 shown in FIG. 2 comprises two windows 260*a*, 260*b*. Naturally, the transmission of radiation towards the outside of the apartment 260 is higher when the respective radio signal penetrates the windows 260*a*, 260*b* as when the radiation penetrates the walls of the apartment 260.

Reference numeral 207 denotes the potential coverage area of the femto access point 200, when an omni-directional antenna is employed. It can easily understood that with the activation of the adjusted coverage area 208 interference radiation radiated from the femto access point 200 into the coverage area 280 of the macro telecommunication network can be effectively reduced. Thereby, the performance of radio links between user equipments 225, 226 of outdoor user, which are served by a non depicted macro base station being assigned to the macro telecommunication network can be significantly improved.

Figure 3A:
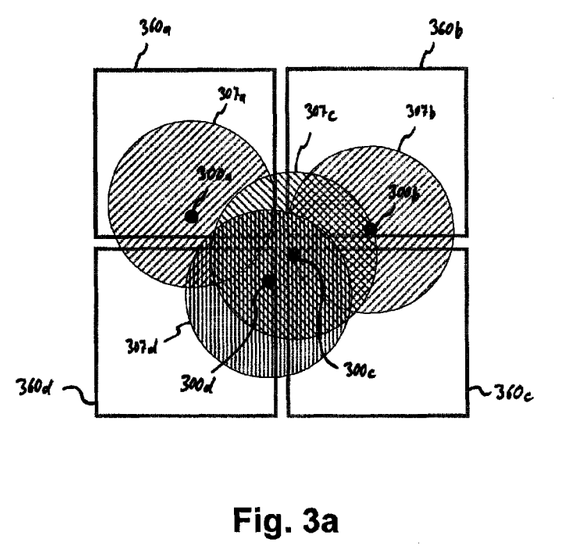
FIG. 3a shows omni-directional antenna radiation patterns of different femto access points located in individual apartments in an apartment house.

FIG. 3*a* shows omni-directional antenna radiation patterns of different femto access points located in individual apartments in an apartment house. Specifically, a floor of the apartment house comprises a first apartment 360*a*, a second apartment 360*b*, a third apartment 360*c* and a fourth apartment 360*d*. A first femto access point 300*a* is deployed in the first apartment 360*a*, a second femto access point 300*b* is deployed in the second apartment 360*b*, a third femto access point 300*c* is deployed in the third apartment 360*c* and a fourth femto access point 300*d* is deployed in the fourth apartment 360*d*.

A first omni-directional coverage area 307*a* is associated with the first femto access point 300*a*, a second omni-directional coverage area 307*b* is associated with the second femto access point 300*b*, a third omni-directional coverage area 307*c* is associated with the third femto access point 300*c* and a fourth omni-directional coverage area 307*d* is associated with the fourth femto access point 300*d*. As can be seen from FIG. 3*a* there is a large spatial overlap between the various omni-directional coverage areas 307*a*, 307*b*, 307*c* and 307*d*. Naturally, this overlap causes a lot of interferences between the different femto access points 300*a*, 300*b*, 300*c* and 300*d*. As a consequence the performance of each femto cell being associated with a corresponding femto access point 300*a*, 300*b*, 300*c* and 300*d* is deteriorated.

Figure 3B:
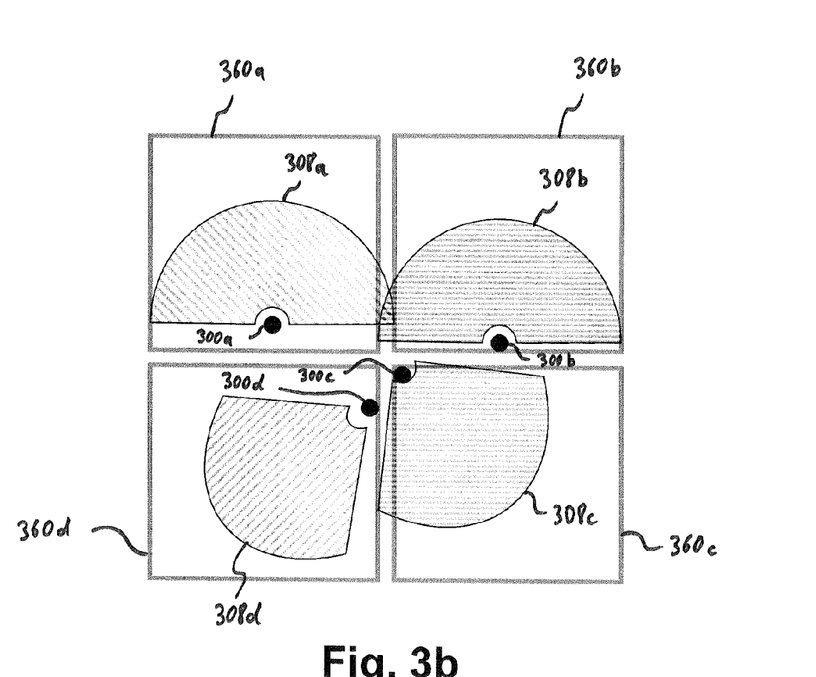
FIG. 3b shows coordinated spatially adjusted antenna radiation patterns of different femto access points located in individual apartments in an apartment house in order to reduce overlapping of coverage areas.

FIG. 3*b* shows coordinated spatially adjusted antenna radiation patterns 308*a*, 308*b*, 308*c* and 308*d* of the femto access points 300*a*, 300*b*, 300*c* and 300*d*, respectively. The coordinated spatial adjustment of the various antenna radiation patterns produces only a negligible overlap. Therefore, compared to the scenario depicted in FIG. 3*a*, interferences between the different femto access points 300*a*, 300*b*, 300*c* and 300*d* are significantly reduced and the performance of each femto cell being associated with a corresponding femto access point 300*a*, 300*b*, 300*c* and 300*d* is significantly improved.

Figure 4:
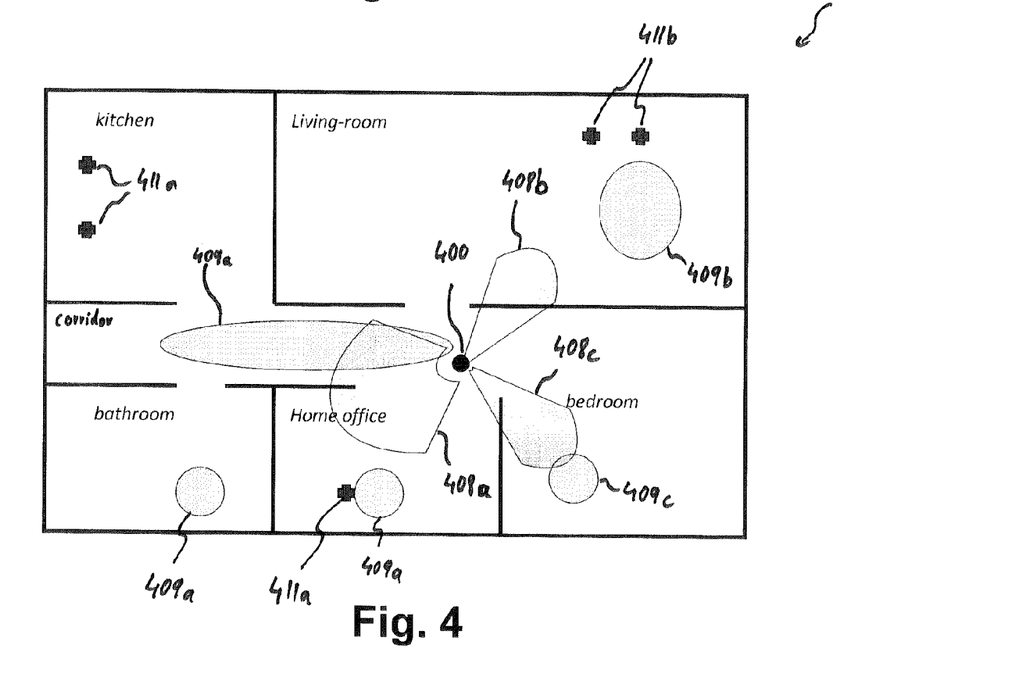
FIG. 4 shows an adjustment of a femto access point antenna radiation pattern in order to follow a user behavior in a home use case.

FIG. 4 shows an adjustment of a femto access point antenna radiation pattern in order to follow a user behavior in a home use case. Specifically, FIG. 4 shows an apartment 460 having a kitchen and a Living-room being arranged on one side of a corridor. Further, the apartment has a bathroom, a Home office and a bedroom being arranged on the opposite side of the corridor.

According to the embodiment described here a femto access point 400 is located in the corridor next to the Home office. As can be seen from FIG. 4, the femto access point 400 can be operated with different spatial characteristic antenna patterns 408*a*, 408*b* and 408*c*.

In the apartment 460 there are arranged various stationary wireless devices 411*a* and 411*b*. The stationary wireless devices may be for instance a hi-fi set, a desktop PC, a TV set, a refrigerator etc. Further, in the apartment 460 there are typical locations 409*a*, 409*b* and 409*c* of using non stationary wireless devices such as a mobile phone, an iPod or a laptop computer.

As can be seen from FIG. 4, activating the spatial characteristic antenna pattern 408*a* is preferable for providing a good radio link between the femto access point 400 and the stationary wireless device 411*a* and mobile wireless device (s) being located in the three location areas 409*a*, which are situated in the kitchen, in the corridor, in the bathroom and in the Home office. Accordingly, activating the spatial characteristic antenna pattern 408*b* is preferable for providing a good radio link between the femto access point 400 and the stationary wireless device 411*b* and a mobile wireless device being located in the location area 409*b*. Last but not least, activating the spatial characteristic antenna pattern 408*c* is preferable for providing a good radio link between the femto access point 400 and a mobile wireless device being located in the location area 409*c*.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS

100 femto access point/femto transmitter/home NodeB
102 transceiver unit
104 antenna
104*a* antenna element
104*b* antenna element
108*a/b/c* spatial characteristic antenna pattern
120 macro base station
125 user equipment
126 user equipment
130 central management node
140 core network
150 gateway
200 femto access point/femto transmitter/home NodeB
207 potential coverage area of femto access point with omni-directional antenna
208 adjusted coverage area of femto access point
225 user equipment of outdoor user
226 user equipment of outdoor user
260 apartment
260*a* window
260*b* window
280 coverage area of macro network
300*a/b/c/d* femto access point in individual apartment
307*a/b/c/d* coverage area with omni-directional antenna
308*a/b/c/d* adjusted coverage area of femto access point
360*a/b/c/d* apartment
400 femto access point/femto transmitter/home NodeB
408*a/b/c* spatial characteristic antenna pattern
409*a/b/c* typical location of using mobile wireless device
411*a/b* stationary wireless devices
460 apartment layout

The invention claimed is:

1. An apparatus, comprising: a femto access point for providing wireless access for a user equipment to a femto cell of a telecommunication network, the femto access point comprising,
   a controller for controlling an antenna adapted to operate with different spatial characteristic antenna patterns for communication with one or more stationary wireless devices located within a pre-determined access range of the femto access point, wherein the antenna comprises at least two antenna elements and the different spatial characteristic antenna patterns are achievable by varying a phase shift between the antenna elements, and the phase shift is applied both when the femto access point is transmitting and receiving a radio signal wherein the transmission to and reception from the antenna is enhanced for wireless communication in the pre-determined access range of the femto access point, and wherein the different spatial characteristic antenna patterns includes antenna patterns optimized for the transmission and reception of wireless communication between the femto access point and the one or more stationary wireless devices located within the pre-determined access range, and
   a transceiver unit, coupled to the antenna and adapted to activate at least one of the different spatial characteristic antenna patterns, wherein
   the transceiver unit comprises a learning system for user equipment including a memory for storing spatial characteristic antenna patterns obtained during a training session, which, after having been successfully trained, is adapted to select an appropriate spatial characteristic antenna pattern from the memory for non-mobile user equipment.

2. The apparatus as claimed in claim 1, wherein the antenna elements are patch elements, which are arranged in an antenna array.

3. The apparatus as claimed in claim 1, wherein the antenna is a flat panel multi beam antenna.

4. The apparatus as claimed in claim 1, further comprising a sensor system for sensing the environment of the femto access point, wherein the sensor system is adapted to provide the transceiver unit information which can be taken into account to activate an appropriate spatial characteristic antenna pattern.

5. The apparatus as claimed in claim 1, wherein the femto access point is adapted
   (a) to receive neighbor information about neighboring access points and
   (b) to assign appropriate frequency and/or scrambling codes used for communication between the femto access point and the user equipment based on the received neighbor information.

6. A method, comprising providing wireless access for a user equipment to a femto cell of a telecommunication network via a femto access point, in particular via a femto access point as set forth in any one of the preceding claims, the method comprising
   activating at least one spatial characteristic antenna pattern of an antenna of a femto access point, wherein the antenna is adapted to operate with different spatial characteristic antenna patterns for communication with one or more stationary wireless devices located within a pre-determined access range of the femto access point, and wherein the antenna comprises at least two antenna elements and the different spatial characteristic antenna patterns are achievable by varying a phase shift between the antenna elements, and the phase shift is applied both when the femto access point is transmitting and receiving a radio signal wherein the transmission to and reception from the antenna is enhanced for wireless communication in the pre-determined access range of the femto access point, and wherein the different spatial characteristic antenna patterns includes antenna patterns optimized for the transmission and reception of wireless communication between the femto access point and the one or more stationary wireless devices located within the pre-determined access range; and
   carrying out a learning phase for user equipment, wherein a memory is used for storing spatial characteristic antenna patterns obtained during a training session, and where for activating the at least one spatial characteristic antenna pattern results obtained by the learning phase and stored in the memory are taken into account for non-mobile user equipment.

7. The method as claimed in claim 6, wherein carrying out the learning phase comprises
successively selecting the different spatial characteristic antenna patterns for radiating a radio signal by the femto access point,
receiving the radio signal for each selected spatial characteristic antenna pattern by a receiving communication device,
measuring the level of each received radio signal, and
reporting to the femto access point which spatial characteristic antenna pattern allows for the best radio link between the femto access point and the receiving communication device.

8. The method as claimed in claim 6, wherein
for each successively selected spatial characteristic antenna pattern the radio signal is received and the respective signal strength is measured by at least two macro base stations being assigned to a macro telecommunication network and
each of the at least two macro base stations reports about the influence of at least one selected spatial characteristic antenna pattern on the performance of the macro telecommunication network.

9. The method as claimed in claim 8, wherein
each of the at least two macro base stations report to a dedicated functionality which spatial characteristic antenna pattern allows for the best performance of the macro telecommunication network and
the dedicated functionality compares the reports of the at least two macro base stations and informs the femto access point about a specific spatial characteristic antenna pattern, which allows for the best performance of the macro telecommunication network.

10. A computer program product embodied on a non-transitory computer-readable medium in which a computer program is stored that, when being executed by a computer, is configured to provide instruction to control or carry out:
activating at least one spatial characteristic antenna pattern of an antenna of a femto access point, wherein the antenna is adapted to operate with different spatial characteristic antenna patterns for communication with one or more stationary wireless devices located within a pre-determined access range of the femto access point, and wherein the antenna comprises at least two antenna elements and the different spatial characteristic antenna patterns are achievable by varying a phase shift between the antenna elements, and the phase shift is applied both when the femto access point is transmitting and receiving a radio signal wherein the transmission to and reception from the antenna is enhanced for wireless communication in the pre-determined access range of the femto access point, and wherein the different spatial characteristic antenna patterns includes antenna patterns optimized for the transmission and reception of wireless communication between the femto access point and the one or more stationary wireless devices located within the pre-determined access range; and
carrying out a learning phase for user equipment, wherein a memory is used for storing spatial characteristic antenna patterns obtained during a training session, and where for activating the at least one spatial characteristic antenna pattern results obtained by the learning phase and stored in the memory are taken into account for non-mobile user equipment.

11. The computer program product as claimed in claim 10, wherein carrying out the learning phase comprises
successively selecting the different spatial characteristic antenna patterns for radiating a radio signal by the femto access point,
receiving the radio signal for each selected spatial characteristic antenna pattern by a receiving communication device,
measuring the level of each received radio signal, and
reporting to the femto access point which spatial characteristic antenna pattern allows for the best radio link between the femto access point and the receiving communication device.

12. The computer program product as claimed in claim 11, wherein
for each successively selected spatial characteristic antenna pattern the radio signal is received and the respective signal strength is measured by at least two macro base stations being assigned to a macro telecommunication network and
each of the at least two macro base stations reports about the influence of at least one selected spatial characteristic antenna pattern on the performance of the macro telecommunication network.

13. The computer program product as claimed in claim 12, wherein
each of the at least two macro base stations report to a dedicated functionality which spatial characteristic antenna pattern allows for the best performance of the macro telecommunication network and
the dedicated functionality compares the reports of the at least two macro base stations and informs the femto access point about a specific spatial characteristic antenna pattern, which allows for the best performance of the macro telecommunication network.

* * * * *